United States Patent
James et al.

(10) Patent No.: US 10,158,530 B2
(45) Date of Patent: Dec. 18, 2018

(54) CONFIGURATION OF A CLUSTER SERVER USING CELLULAR AUTOMATA

(71) Applicant: Advanced Micro Devices, Inc., Sunnyvale, CA (US)

(72) Inventors: Michael E. James, Mountain View, CA (US); Jean-Philippe Fricker, Mountain View, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 797 days.

(21) Appl. No.: 14/461,614

(22) Filed: Aug. 18, 2014

(65) Prior Publication Data

US 2015/0333956 A1    Nov. 19, 2015

(51) Int. Cl.
| | |
|---|---|
| *G06F 15/177* | (2006.01) |
| *H04L 12/24* | (2006.01) |
| *H04L 12/753* | (2013.01) |
| *G06F 15/173* | (2006.01) |

(52) U.S. Cl.
CPC .... *H04L 41/0886* (2013.01); *G06F 15/17387* (2013.01); *H04L 41/0806* (2013.01); *H04L 41/16* (2013.01); *H04L 45/48* (2013.01)

(58) Field of Classification Search
CPC .............. H04L 41/0886; H04L 41/0803; H04L 41/0806; H04L 45/18; H04L 41/16
USPC ......... 709/202–203, 220–222, 252, 238–241
See application file for complete search history.

(56) References Cited

U.S. PATENT DOCUMENTS

| | | | | |
|---|---|---|---|---|
| 7,072,976 | B2 * | 7/2006 | Lee ........................ | H04L 45/06 709/238 |
| 7,187,659 | B2 * | 3/2007 | Hammons ............. | H04L 49/357 709/220 |
| 8,332,497 | B1 | 12/2012 | Gladish et al. | |
| 8,621,103 | B2 * | 12/2013 | Hlibiciuc .............. | H04L 65/104 709/238 |
| 8,958,340 | B2 * | 2/2015 | Bao ....................... | H04L 41/046 709/220 |
| 9,264,347 | B2 * | 2/2016 | Anumala ................ | H04L 45/48 |
| 2002/0049859 | A1 * | 4/2002 | Bruckert ................. | H04L 67/16 709/246 |
| 2003/0097468 | A1 * | 5/2003 | Hamadi .................. | H04L 45/00 709/252 |
| 2005/0120160 | A1 | 6/2005 | Plouffe et al. | |
| 2007/0050520 | A1 * | 3/2007 | Riley .................. | H04L 41/0803 709/239 |
| 2008/0147937 | A1 | 6/2008 | Freimuth et al. | |

(Continued)

OTHER PUBLICATIONS

International Search Report and Written Opinion correlating to PCT/US15/044607 dated Nov. 19, 2015, 8 pages.

(Continued)

*Primary Examiner* — Bharat Barot

(57) ABSTRACT

A cluster computer server is configured after a system reset or other configuration event. Each node of a fabric of the cluster compute server is employed, for purposes of configuration, as a cell in a cellular automaton, thereby obviating the need for a special configuration network to communicate configuration information from a central management unit. Instead, the nodes communicate configuration information using the same fabric interconnect that is used to communicate messages during normal execution of software services at the nodes.

20 Claims, 10 Drawing Sheets

(56) References Cited

U.S. PATENT DOCUMENTS

| | | | |
|---|---|---|---|
| 2009/0219827 A1* | 9/2009 | Chen | H04L 49/357 |
| | | | 370/252 |
| 2011/0103259 A1 | 5/2011 | Aybay et al. | |
| 2011/0238969 A1 | 9/2011 | Warkentin et al. | |
| 2013/0212145 A1* | 8/2013 | Archer | G06F 9/5066 |
| | | | 709/201 |
| 2014/0188996 A1* | 7/2014 | Lie | H04L 49/405 |
| | | | 709/204 |
| 2015/0103826 A1* | 4/2015 | Davis | H04L 49/25 |
| | | | 370/392 |
| 2017/0063729 A1* | 3/2017 | Shukla | H04L 49/357 |

OTHER PUBLICATIONS

International Preliminary Report on Patentability issued in PCT/US2015/044607 dated Mar. 2, 2017, 7 pages.
Extended European Search Report dated Feb. 5, 2018 for European Application 15834327.7, 8 pages.
Toshinage, T. et al., "Network Reconfiguration Protocols for Fault-Tolerant Adaptive Deadlock-Recovery Routing," Ronbunshi (Journal), The institute of Electronics, Information and Communication Engineers, Japan, Dec. 2008; vol. J91-D, No. 12, pp. 2881-2891.
Office Action dated Jul. 17, 2018 for corresponding Japanense Patent Application No. 2017-509660, 7 pages.

* cited by examiner

CONFIGURATION OF A CLUSTER SERVER USING CELLULAR AUTOMATA

BACKGROUND

Field of the Disclosure

The present disclosure relates generally to processing systems and more particularly to configuration of a cluster server.

Description of the Related Art

High performance computing systems, such as server systems, are sometimes implemented using compute nodes connected together by one or more fabric interconnects. The compute nodes execute software programs to perform designated services, such as file management, database management, document printing management, web page storage and presentation, computer game services, and the like, or a combination thereof. The multiple compute nodes facilitate the processing of relatively large amounts of data while also facilitating straightforward build-up and scaling of the computing system. The fabric interconnects provide a backbone for communication between the compute nodes, and therefore can have a significant impact on processor performance. In order to use the fabric interconnect after a system reset, the compute nodes typically have to be configured with address and routing tables that implement the fabric interconnect's communication scheme.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENTS

Figure 1:
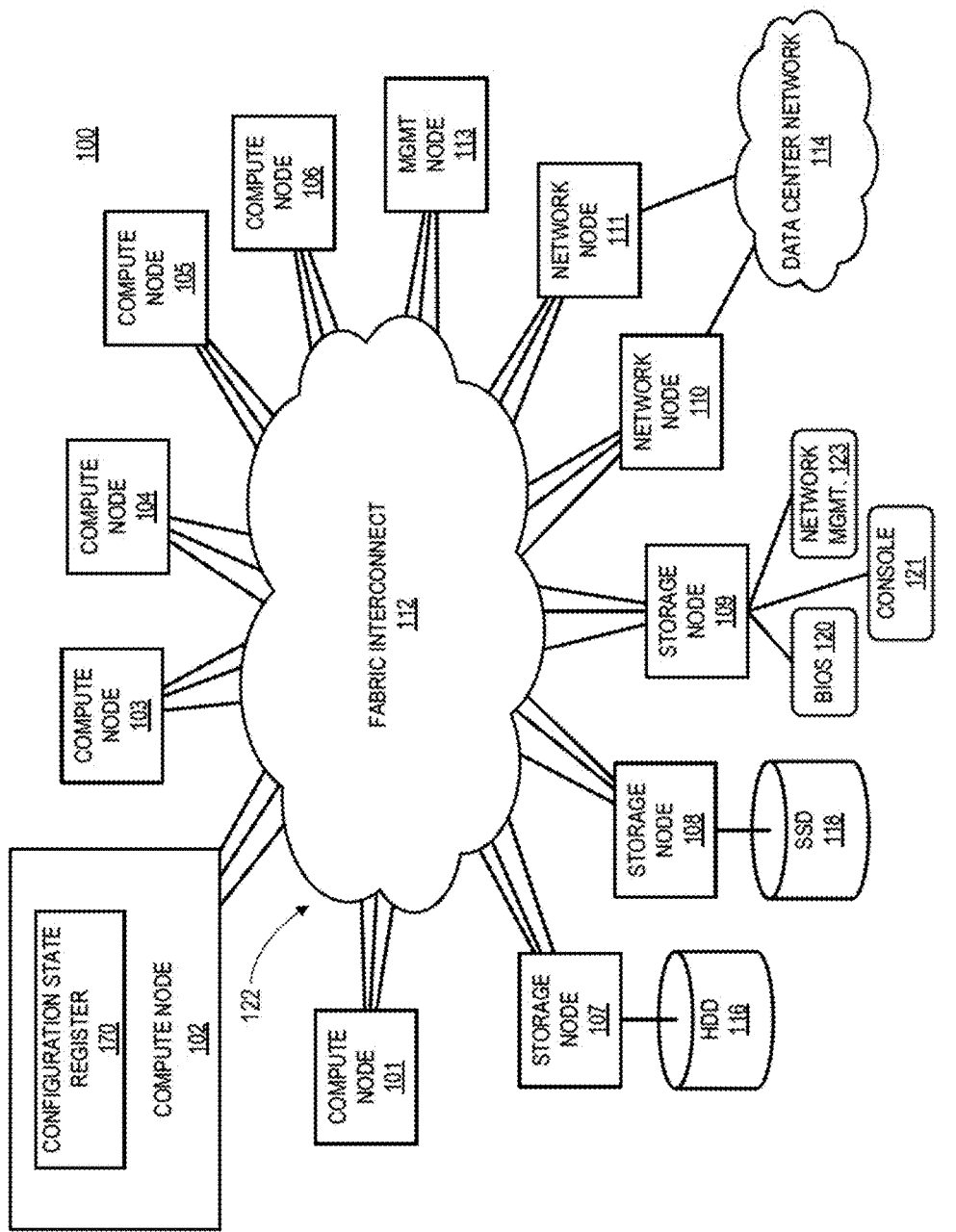
FIG. 1 is a block diagram of a cluster compute server in accordance with some embodiments.

FIGS. 1-14 illustrate techniques for configuring a fabric of a cluster compute server after a system reset or other configuration event. Each node of the fabric is employed, for purposes of configuration, as a cell in a cellular automaton, thereby obviating the need for a special configuration network to communicate configuration information from a central management unit. Instead, the nodes communicate configuration information using the same fabric interconnect that is used to communicate messages during normal execution of software services at the nodes, without requiring the fabric interconnect to be pre-configured for network routing in advance according to a fixed topology. This reduces server complexity and providing for better scalability of the cluster compute server.

To illustrate, the cluster compute server employs the fabric interconnect to connect its various nodes. During normal operation, as the compute nodes execute software services, it is useful for each node to be able to communicate unicast messages to each other node of the server, thereby improving overall server efficiency and quality of the software services. Accordingly, during normal operation the fabric of the compute server implements a message routing scheme whereby each node has a fixed address in the fabric, and locally stores routing information (e.g. a routing table) that delineates the routing rules for the message routing scheme. Permanently storing fixed routing information at each of the compute nodes is typically not feasible, because the topology of the fabric can change over time due to errors or failures at individual compute node. Such topology changes will invalidate large portions of the fixed routing information, reducing server performance. Accordingly, it is useful for the compute server to configure the fabric after each system reset, whereby during configuration the fabric: 1) identifies the topology of the fabric as defined by the fabric's functioning nodes, and 2) distributes to each functioning node a unique address and routing information. This process is referred to herein as the "configuration" of the compute server (or configuration of the fabric).

To perform configuration, conventional cluster compute servers typically employ an "out-of-band" network, separate from the fabric interconnect used to communicate messages between nodes during normal operation. However, in server systems with many compute nodes, the out-of-band network requires a large amount of time to distribute the node addresses and routing information and to otherwise configure each of the fabric nodes. In addition, the out-of-band network itself must have the infrastructure to route all of the configuration messages to the individual nodes, increasing the complexity and cost of the compute server.

In contrast to a conventional compute server, the techniques disclosed herein provide for a cluster compute server that communicates node addresses, routing information, and other configuration information by incorporating, at each of the compute nodes, a register or other storage structure to store a defined set of configuration fields, whereby each field can take on any of a limited set of corresponding states. At defined intervals of time, referred to here as configuration cycles, each node of the server sets the state of each of its configuration fields (either remaining in its previous state or evolving to a new state) based on the previous state of the configuration field and on the state of the corresponding configuration field at each of other nodes connected to it via the fabric interconnect. Based on the states of its configuration fields, a node will execute one or more sets of predefined, stored configuration instructions associated with the states of the configuration fields. Thus, the configuration fields define one or more tasks executed at the compute node, and depend only on the states of corresponding fields at the configuration registers of its connected nodes. The cluster compute server disclosed herein therefore does not need to employ an out-of-band configuration network, simplifying the compute server design and allowing for faster configuration of a large number of compute nodes. Instead, the techniques disclosed herein create a virtual out-of-band network by distributing configuration information based on state changes in neighboring nodes.

In some embodiments, the changing states at the compute nodes perform at least two configuration operations for the cluster compute server: a topology analysis and communication of configuration messages. For topology analysis, the states of the configuration fields of the compute nodes evolve such that 1) functioning compute nodes are detected and prepared for communication of configuration messages; and 2) the compute nodes self-organize into a spanning tree. Once the spanning tree has been organized, the fabric nodes can communicate configuration messages, wherein the nodes distribute messages to their connected nodes according to distribution rules implied by the message type. One or more management units of the cluster compute server inject configuration information by initiating a configuration message at the root compute node of the spanning tree, and the distribution rules at each node cause the message to reach each compute node in the spanning tree. The management unit can thereby distribute configuration information, such as routing tables, node address information, and the like, to prepare the nodes for normal operation.

In some scenarios, the cluster compute server can re-engage in topology analysis in response to defined error conditions, such as detection of a faulty compute node in the spanning tree. The compute nodes will then adjust the spanning tree topology by automatically returning the corresponding configuration fields to the corresponding topology analysis states and reforming the spanning tree. Thus, the compute nodes can automatically adjust for failures at individual compute nodes and other errors.

For ease of illustration, the configuration of a server is described in the example context of a cluster compute server as described below with reference to FIGS. 1-12. Examples of such servers include the SM10000 series or the SM15000 series of servers available from the SeaMicro™ division of Advanced Micro Devices, Inc. Although a general description is described below, additional details regarding embodiments of the cluster compute server are found in U.S. Pat. Nos. 7,925,802 and 8,140,719, the entireties of which are incorporated by reference herein. The techniques described herein are not limited to this example context, but instead may be implemented in any of a variety of servers. Moreover, while these techniques are described in the context of an Ethernet implementation employing MAC addresses, these techniques may be implemented in any of a variety of link layer protocols and addressing schemes.

FIG. 1 illustrates a cluster compute server 100 in accordance with some embodiments. The cluster compute server 100, referred to herein as "server 100", comprises a data center platform that brings together, in a rack unit (RU) system, computation, storage, switching, and server management. The server 100 is based on a parallel array of independent low power compute nodes (e.g., compute nodes 101-106), storage nodes (e.g., storage nodes 107-109), network nodes (e.g., network nodes 110 and 111), and management nodes (e.g., management unit 113) linked together by a fabric interconnect 112, which comprises a high-bandwidth, low-latency supercomputer interconnect. Each node is implemented as a separate field replaceable unit (FRU) comprising components disposed at a printed circuit board (PCB)-based card or blade so as to facilitate efficient build-up, scaling, maintenance, repair, and hot swap capabilities.

The compute nodes operate to execute various software programs, including operating systems (OSs), hypervisors, virtualization software, compute applications, and the like. As with conventional server nodes, the compute nodes of the server 100 include one or more processors and system memory to store instructions and data for use by the one or more processors. However, unlike conventional server nodes, in some embodiments the compute nodes do not individually incorporate various local peripherals, such as storage, I/O control, and network interface cards (NICs). Rather, remote peripheral resources of the server 100 are shared among the compute nodes, thereby allowing many of the components typically found on a server motherboard, such as I/O controllers and NICs, to be eliminated from the compute nodes and leaving primarily the one or more processors and the system memory, in addition to a fabric interface device.

After configuration in response to a system reset, the fabric interface device, which may be implemented as, for example, an application-specific integrated circuit (ASIC), operates to virtualize the remote shared peripheral resources of the server 100 such that these remote peripheral resources appear to the OS executing at each processor to be located on corresponding processor's local peripheral bus. These virtualized peripheral resources can include, but are not limited to, mass storage devices, consoles, Ethernet NICs, Fiber Channel NICs, Infiniband™ NICs, storage host bus adapters (HBAs), basic input/output system (BIOS), Universal Serial Bus (USB) devices, Firewire™ devices, PCIe devices, user interface devices (e.g., video, keyboard, and mouse), and the like. This virtualization and sharing of remote peripheral resources in hardware renders the virtualization of the remote peripheral resources transparent to the OS and other local software at the compute nodes. Moreover, this virtualization and sharing of remote peripheral resources via the fabric interface device permits use of the fabric interface device in place of a number of components typically found on the server motherboard. This reduces the number of components implemented at each compute node, which in turn enables the compute nodes to have a smaller form factor while consuming less energy than conventional server blades which implement separate and individual peripheral resources.

The storage nodes and the network nodes (collectively referred to as "input/output (I/O) nodes") implement a peripheral device controller that manages one or more shared peripheral resources. This controller coordinates with the fabric interface devices of the compute nodes to virtualize and share the peripheral resources managed by the resource manager. To illustrate, the storage node 107 manages a hard disc drive (HDD) 116 and the storage node 108 manages a solid state drive (SSD) 118. In some embodiments, any internal mass storage device can mount any processor. Further, mass storage devices may be logically separated into slices, or "virtual disks", each of which may be allocated to a single compute node, or, if used in a read-only mode, shared by multiple compute nodes as a large shared data cache. The sharing of a virtual disk enables users to store or update common data, such as operating systems, application software, and cached data, once for the entire server 100. As another example of the shared peripheral resources managed by the I/O nodes, the storage node 109 manages a remote BIOS 120, a console/universal asynchronous receiver-transmitter (UART) 121, and a data center management network 123. The network nodes 110 and 111 each manage one or more Ethernet uplinks connected to a data center network 114. The Ethernet uplinks are analogous to the uplink ports of a top-of rack switch and can be configured to connect directly to, for example, an end-of-row switch or core switch of the data center network 114. The remote BIOS 120 can be virtualized in the same manner as mass storage devices, NICs and other peripheral resources so as to operate as the local BIOS for some or all of the nodes of the server, thereby permitting such nodes to forgo implementation of at least a portion of local BIOS at each node. In some embodiments the nodes of the server each include local BIOS that is executed in response to a system reset. Execution of the local BIOS allows each node to participate in the configuration processes described further herein. In particular, execution of the local BIOS provides for the execution of tasks at a node according to the node's state, and provides for transitioning the nodes to different states according to the node's previous state and the state of its connected nodes.

The fabric interface device of the compute nodes, the fabric interfaces of the I/O nodes, and the fabric interconnect 112 together operate as a fabric 122 connecting the computing resources of the compute nodes with the peripheral resources of the I/O nodes. To this end, the fabric 122 implements a distributed switching facility whereby each of the fabric interfaces and fabric interface devices comprises multiple ports connected to bidirectional links of the fabric interconnect 112 and, after configuration of the fabric interconnect 112 in response to a system reset, operate as link layer switches to route packet traffic among the ports in accordance with deterministic routing logic implemented at the nodes of the server 100. Note that the term "link layer" generally refers to the data link layer, or layer 2, of the Open System Interconnection (OSI) model.

The fabric interconnect 112 can include a fixed or flexible interconnect such as a backplane, a printed wiring board, a motherboard, cabling or other flexible wiring, or a combination thereof. Moreover, the fabric interconnect 112 can include electrical signaling, photonic signaling, or a combination thereof. In some embodiments, the links of the fabric interconnect 112 comprise high-speed bi-directional serial links implemented in accordance with one or more of a Peripheral Component Interconnect-Express (PCIE) standard, a Rapid IO standard, a Rocket IO standard, a HyperTransport standard, a FiberChannel standard, an Ethernet-based standard, such as a Gigabit Ethernet (GbE) Attachment Unit Interface (XAUI) standard, and the like.

Although the FRUs implementing the nodes typically are physically arranged in one or more rows in a server box as described below with reference to FIG. 12, the fabric 122 can, during configuration, logically arrange the nodes in any of a variety of mesh topologies or other network topologies, such as a torus, a multi-dimensional torus (also referred to as a k-ary n-cube), a tree, a fat tree, and the like. For purposes of illustration, the server 100 is described herein in the context of a multi-dimensional torus network topology. However, the described techniques may be similarly applied in other network topologies using the guidelines provided herein.

Each of the compute nodes 101-106 includes a configuration state register (e.g. configuration state register 170 at compute node 101) to store a set of configuration fields for the corresponding compute node. Each configuration field stores state information for a particular aspect of the configuration of the corresponding compute node, as described further herein. For example, one of the configuration fields can store configuration information indicating the corresponding compute node's location, relative to its connected nodes, in a spanning tree that maps the nodes of the server 100. In operation, each compute node periodically checks the configuration fields at the configuration state registers of its connected compute nodes and based on the values of these fields, updates the values at the configuration fields of its own configuration state register. Based on the values at the configuration fields of its configuration state register, a compute node performs defined configuration operations, such as internal processing of configuration messages, communication of configuration messages to its connected nodes, generating data responsive to configuration messages, and the like. In addition, by causing transitions at its connected nodes and observing changes in the states at those nodes, a compute node can identify the state and configuration of nodes to which it is not connected (remote nodes), and can generate messages which, when propagated through the fabric as described herein, cause changes in state and configuration at the remote nodes.

To configure each compute node, the configuration fields at the configuration state registers of each compute node evolve over time based on configuration information injected by the management node 113. The state updates for each configuration field are defined such that the evolution of the configuration fields results in each compute node receiving a unique address in the topology of the fabric interconnect 112 and routing information that allows messages to be routed between nodes according to the unique addresses of each node. The compute nodes are thereby prepared for routing of unicast messages during normal (post-configuration) operation of the server 100.

Figure 2:
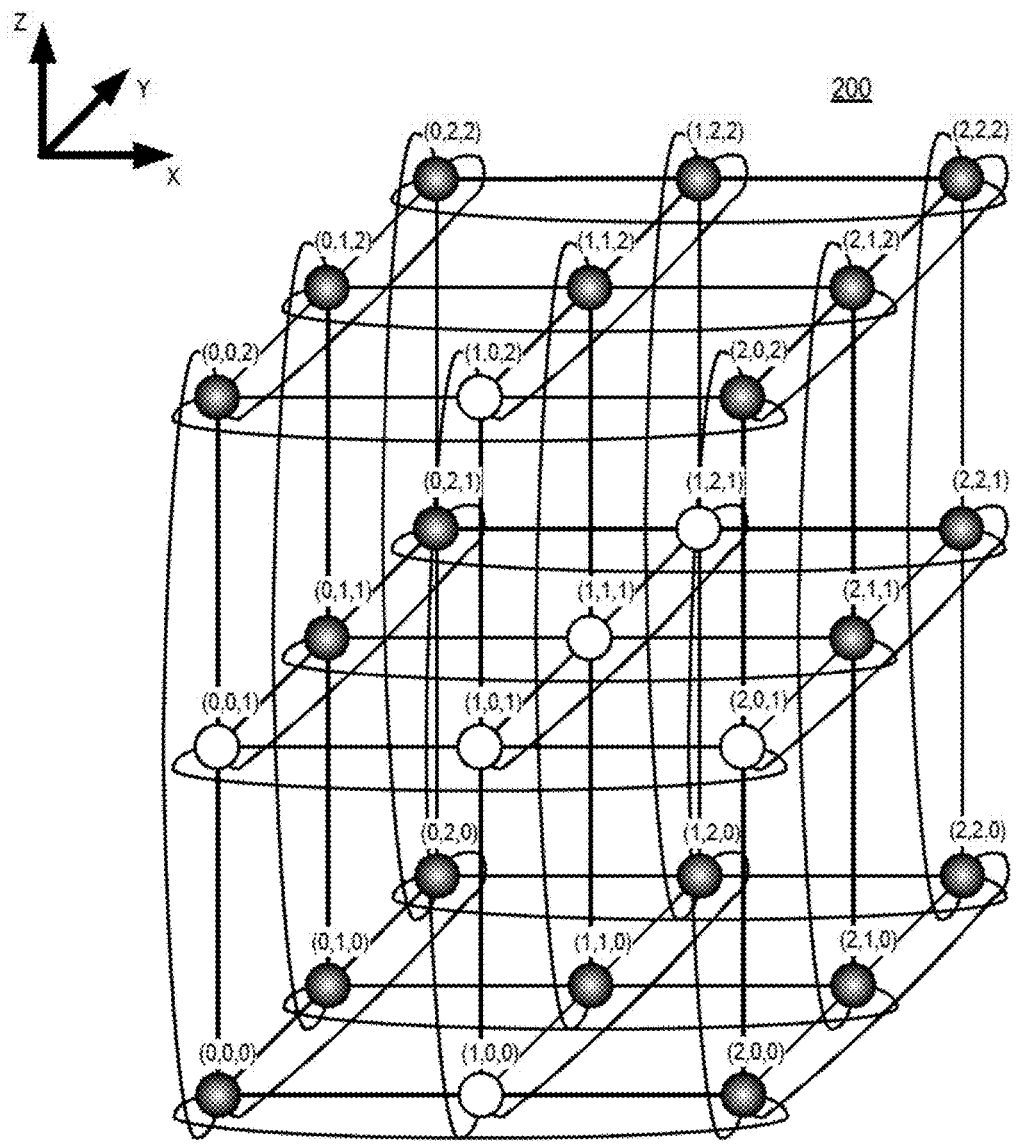
FIG. 2 is a block diagram illustrating an example network topology implemented for a cluster compute server in accordance with some embodiments.

FIG. 2 illustrates an example configuration of the server 100 in a network topology arranged as a k-ary n-cube, or multi-dimensional torus, in accordance with some embodiments. In the depicted example, the server 100 implements a three-dimensional (3D) torus network topology (referred to herein as "torus network 200") with a depth of three (that is, k=n=3). Accordingly, the server 100 implements a total of twenty-seven nodes arranged in a network of rings formed in three orthogonal dimensions (X,Y,Z), and each node is a member of three different rings, one in each of the dimensions. Each node is connected to up to six neighboring nodes via bidirectional serial links of the fabric interconnect 112 (see FIG. 1). The relative location of each node in the torus network 200 is identified in FIG. 2 by the position tuple (x,y,z), where x, y, and z represent the positions of the compute node in the X, Y, and Z dimensions, respectively. As such, the tuple (x,y,z) of a node also may serve as its address within the torus network 200, and thus serve as source routing control for routing packets to the destination node at the location represented by the position tuple (x,y,z).

In some embodiments, in response to a system reset the fabric interconnect 112 configures each node so that one or more media access control (MAC) addresses is temporarily or permanently associated with a given node. Some or all of such associated MAC address may directly represent the position tuple (x,y,z), which allows the location of a destination node in the torus network 200 to be determined and source routed based on the destination MAC address of the packet. During configuration, distributed look-up tables of MAC address to position tuple translations may be cached at the nodes to facilitate the identification of the position of a destination node based on the destination MAC address.

It will be appreciated that the illustrated X, Y, and Z dimensions represent logical dimensions that describe the positions of each node in a network, but do not necessarily represent physical dimensions that indicate the physical placement of each node. For example, the 3D torus network topology for torus network 200 can be implemented via the wiring of the fabric interconnect 112 with the nodes in the network physically arranged in one or more rows on a backplane or in a rack. That is, the relative position of a given node in the torus network 200 is defined by nodes to which it is connected, rather than the physical location of the compute node. In some embodiments, the fabric 122 (see FIG. 1) comprises a plurality of sockets wired together via the fabric interconnect 112 so as to implement the 3D torus network topology, and each of the nodes comprises a field replaceable unit (FRU) configured to couple to the sockets used by the fabric interconnect 112, such that the position of the node in torus network 200 is dictated by the socket into which the FRU is inserted.

In the server 100, after configuration of the fabric interconnect 112, messages communicated between nodes are segmented into one or more packets, which are routed over a routing path between the source node and the destination node. The routing path may include zero, one, or more than one intermediate node. As noted above, each node, including each I/O node, includes an interface to the fabric interconnect 112 that implements a link layer switch to route packets among the ports of the node connected to corresponding links of the fabric interconnect 212. In some embodiments, after configuration of these distributed switches operate to route packets over the fabric 122 using source routing or a source routed scheme, such as a strict deterministic dimensional-order routing scheme (that is, completely traversing the torus network 200 in one dimension before moving to another dimension) that aids in avoiding fabric deadlocks. To illustrate an example of strict deterministic dimensional-order routing, a packet transmitted from the node at location (0,0,0) to location (2,2,2) would, if initially transmitted in the X dimension from node (0,0,0) to node (1,0,0) would continue in the X dimension to node (2,0,0), whereupon it would move in the Y plane from node (2,0,0) to node (2,1,0) and then to node (2,2,0), and then move in the Z plane from node (2,2,0) to node (2,2,1), and then to node (2,2,2). The order in which the planes are completely traversed between source and destination may be preconfigured and may differ for each node.

Moreover, as there are multiple routes between nodes in the torus network 200, the fabric 212 can be configured, during the configuration process, for packet traffic to traverse a secondary path in case of a primary path failure. The fabric 212 also can be configured to implement packet classes and virtual channels to more effectively utilize the link bandwidth and eliminate packet loops, and thus avoid the need for link-level loop prevention and redundancy protocols such as the spanning tree protocol.

Conventionally, certain types of nodes are configured to be limited in their routing capabilities during normal execution of software services at the server. For example, compute nodes are permitted to act as intermediate nodes that exist in the routing path of a packet between the source node of the packet and the destination node of the packet, whereas I/O nodes are configured so as to act as only source nodes or destination nodes, and not as intermediate nodes that route packets to other nodes. In the illustrated embodiment, each I/O node is configured to route packets in a similar fashion to the compute nodes, so that all nodes provide similar routing capability.

The fabric 122 may be configured to implement various packet routing and techniques protocols. For example, to avoid the need for large buffers at switch of each node, the fabric 122 may, after configuration, use flow control digit ("flit")-based switching whereby each packet is segmented into a sequence of flits. The first flit, called the header flit, holds information about the packet's route (namely the destination address) and sets up the routing behavior for all subsequent flit associated with the packet. The header flit is followed by zero or more body flits, containing the actual payload of data. The final flit, called the tail flit, performs some bookkeeping to release allocated resources on the source and destination nodes, as well as on all intermediate nodes in the routing path. These flits then may be routed through the torus network 200 using cut-through routing, which allocates buffers and channel bandwidth on a packet level, or wormhole routing, which allocated buffers and channel bandwidth on a flit level. Wormhole routing has the advantage of enabling the use of virtual channels in the torus network 200. A virtual channel holds the state needed to coordinate the handling of the flits of a packet over a channel, which includes the output channel of the current node for the next hop of the route and the state of the virtual channel (e.g., idle, waiting for resources, or active). The virtual channel may also include pointers to the flits of the packet that are buffered on the current node and the number of flit buffers available on the next node.

Figure 3:
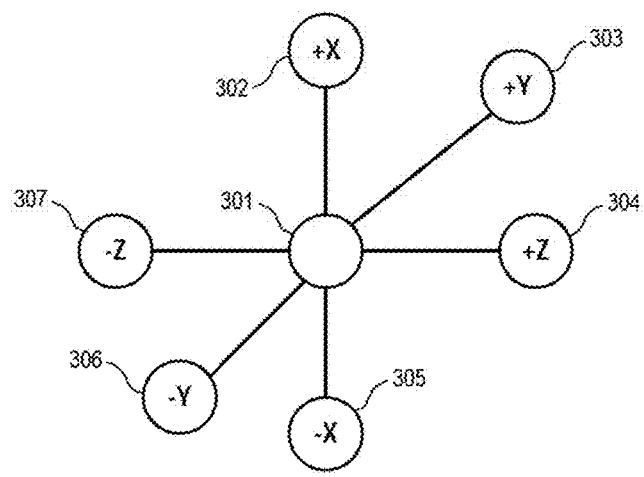
FIG. 3 is a block diagram illustrating an example compute node and its dimensional relationship to its connected compute nodes in the network topology of FIG. 2 in accordance with some embodiments.

FIG. 3 illustrates a node 301 of the fabric 122 and its connected nodes 302, 303, 304, 305, 306, and 307. Node 301 is connected to each of the nodes 302-307 via a corresponding communication port. In some embodiments, the node 301 internally identifies each of its connected nodes 302-307 according to their expected relative position in a 3D torus topology. Thus, the node 302 is identified by the node 301 as it's "+X" node, indicating that the node 302 is expected to lie in one direction along an X-plane of the 3D torus relative to the node 301. Node 305 is identified by the node 301 as it's "−X" node, indicating that the node 302 is expected to lie in the opposite direction of node 302 along the X-plane of the 3D torus, relative to the node 301. For analogous reasons, node 303 is identified by node 301 as it's "+Y" node, node 306 is identified by node 301 as it's "−Y node", node 304 is identified by node 301 as it's "+Z" node, and node 307 is identified by node 301 as it's "−Z" node.

In response to a system reset, the node 301 periodically sends tokens, via the fabric interconnect 122, to its connected nodes 302-307 indicating the present state of each of its configuration fields. In addition, the node 301 receives, via the fabric interconnect 122, tokens from its connected nodes 302-307 indicating the corresponding states of each of the configuration fields for each of the connected nodes 302-307. Based on the current states of its configuration fields and the states of the configuration fields at its connected nodes 302-307, the node 301 adjusts its the states of its own configuration fields state and executes any processing operations required by the adjusted state.

Figure 4:
FIG. 4 is a block diagram illustrating configuration state fields for a compute node of a cluster compute server in accordance with some embodiments.

FIG. 4 illustrates an example of the configuration state register (CSR) 170 in accordance with some embodiments. In the illustrated example, the CSR 170 stores values for a number of configuration fields, including an address and orientation field 401, a spanning tree state field 402, an interrupt forwarding state field 403, a wave message state 404, and a chain message state 405. Each of the configuration fields 401-405 stores a value indicating the state for that field. During each configuration cycle, the compute node 102 takes configuration actions based on the state of each configuration field. In addition, by the end of each configuration cycle, the compute node 102 updates each of the configuration fields 401-405 based on the values of the corresponding configuration fields at each of its corrected nodes.

To illustrate, the address and orientation field 401 stores information indicating an orientation of the FRU associated with the compute node 102. After a system reset, the compute node 102 sets the value at the address and orientation field 401 to indicate that the orientation of the FRU is unknown. In response to the address and orientation field at one of its connected nodes indicating a particular orientation for its corresponding FRU, the compute node 102 updates the address and orientation field 401 to indicate that the FRU associated with the compute node 102 has the same orientation as the connected node's FRU.

The spanning tree state field 402 stores information indicating whether the compute node 102 is ready to join a spanning tree for the nodes of the fabric interconnect 112 and, once it has joined, its location, relative to its connected nodes, in the spanning tree. For example, after a system reset the compute node 102 can set the value at the spanning tree state field 402 to an IDLE state, indicating that the compute node 102 has not yet joined the spanning tree. In response to the spanning tree state field at one of its connected nodes being placed in a READY state, the compute node 102 sets the spanning tree state field 402 to a READY state, indicating that it is ready to join the spanning tree. Based on subsequent changes in the states at the spanning tree state field at each of its connected nodes, the compute node 102 evolves the state of the spanning tree state field 402 to indicate the compute node's position in the spanning tree, relative to its connected nodes. As described further herein, the spanning tree that results from the evolution of the spanning tree state fields at each of the compute nodes of the server 100 is used to communicate configuration messages to configure each node.

The interrupt forwarding state field 403 stores information indicating the state of interrupt messages received from or sent to connected nodes of the compute node 102. For example, in some embodiments, after the compute node 102 has joined the spanning tree for the nodes of the fabric interconnect 112, it sets the state of the interrupt forwarding state field 403, based on the states of the interrupt forwarding state fields at its connected nodes to reflect the status of interrupts received from those connected nodes, to reflect when it has received an interrupt message from one of its connected nodes, whether it has forwarded the interrupt message to another of its connected nodes, whether a response to an interrupt message has been received, and the like. In addition, the compute node 102 processes received interrupt messages and responses based on the state of its forwarding state field 403, including forwarding received messages to other connected nodes based on the state of the forwarding field 403. The interrupt forwarding field 403 thereby provides a low-latency mechanism for the forwarding of interrupt messages via the fabric interconnect 112 without the use of direct addressing of individual nodes.

The wave message state field 404 and chain message state fields 405 each store values indicating the state of processing of particular configuration message types, as described further herein. During configuration, the compute node 102 evolves the states of each of the fields 404 and 405 based on the messages received of each type, to ensure that the messages are processed according to a defined protocol.

In some embodiments, the compute node 102 stores BIOS code or other configuration information that, when executed by the compute node 102, updates each of the configuration fields 401-405 according to corresponding formulae defined by the BIOS code or other configuration information. This ensures that the state information at each configuration field evolves according to a defined process, as indicated by the formulae, that ensures each node is configured according to a defined configuration process. Because the formulae provide for evolution of the configuration fields without direct communication of state information by a configuration node or other control node, the need for a special out-of-band configuration network is obviated.

A general form of a formula providing for the evolution of a configuration field is set forth below:

$$S_{i,n+1} = f(\{S_{j,n} | j \in N(i)\})$$

where $S_{i,n}$ is the state of the configuration field for node S at configuration cycle n, and N(i) is the connected cells of interest for node S. The particular function and N(i) can be different for each configuration field, and N(i) can change based on the state of one or more of the configuration fields, thus providing for more complex evolutions of the configuration fields.

Figure 5:
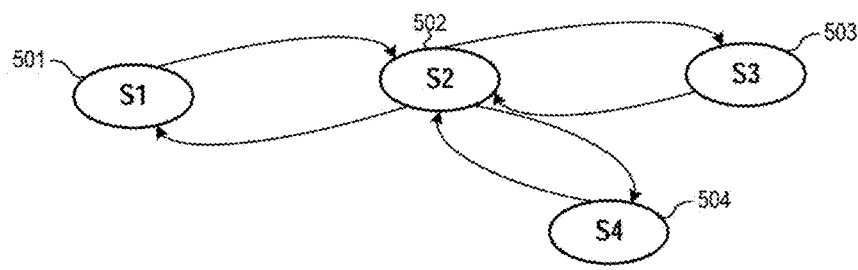
FIG. 5 is block diagram illustrating a set of configuration states for one of the configuration state fields of FIG. 4 in accordance with some embodiments.

FIG. 5 illustrates an example set 500 of states for a configuration field of compute node 102 in accordance with some embodiments. The set 500 includes states 501, 502, 503, and 504, each represented by a different value stored at the configuration field. The arrows between the states 501-504 represent transitions between the states resulting from changes in the values at the corresponding configuration fields of one or more of the nodes connected to the compute node 102.

To illustrate, in some embodiments the set 500 is the set of states for the spanning tree state 402 of FIG. 1. In response to a system reset, the spanning tree state 402 is placed into state 501, representing an IDLE state. In the IDLE state, the compute node 102 periodically sends out tokens indicating its IDLE state to its connected nodes.

In response to receiving a token (referred to as a "TOPO" token for purposes of description) from at least one of its connected nodes that the corresponding connected node has entered a READY state, the compute node 102 transitions the spanning tree state 402 to state 502, representing a READY state. While in the READY state, in response to receiving spanning tree information from one of its connected nodes, indicating the connected nodes relative position in the spanning tree, the compute node 102 transitions the spanning tree state 402 to state 503. In state 503, the compute node 102 identifies its location in a spanning tree relative to its connected nodes. For example, in some embodiments the compute node identifies the connected node that sent the TOPO token as the node closer (more proximal) to the root of the spanning tree. The node that sends the TOPO token is thus identified by the compute node 102 as its "proximal node" for the spanning tree. The compute node 102 can then transition back to the READY state 502.

In addition, in the READY state 502 the compute node 102 can receive tokens from its connected nodes indicating that the compute node 102 has been established as the proximal node for one or more of the connected nodes. In response, the compute node 102 transitions the spanning tree state 402 to state 504. When the spanning tree state 402 is in state 504, the compute node 102 stores information indicating which of its connected nodes are its "distal nodes" in the spanning tree. By identifying its proximal node and its distal nodes, the compute node 102 identifies its own position in the spanning tree relative to its connected nodes, without identifying the overall topology of the spanning tree. This simplifies configuration at each of the nodes of the fabric 122.

In some scenarios, while in the IDLE state 501 the compute node 102 can concurrently receive TOPO tokens from multiple ones of its connected nodes, indicating that each of the multiple ones has transitioned from the IDLE state 501 to the READY state 502. In response, the compute node 102 transitions to the READY state and identifies, according to a predefined convention reflected in the BIOS code, one of the connected nodes that sent a TOPO token as its proximal node in the spanning tree. For example, in some embodiments each node includes a counter, whereby the counter is initially set to zero in response to a system reset. In response to transitioning to the READY state 502, a node increments its counter and communicates the incremented value as a tree-depth field incorporated in the TOPO token it sends to its connected nodes. In response to receiving a single TOPO token while in the IDLE state 501, a node sets its own counter to the value of the tree-depth field. Accordingly, each node's counter will indicate the depth of the node in the spanning tree. In response to receiving multiple TOPO tokens while in the IDLE state, a node selects the TOPO token with the tree-depth field having the lowest value, increments the value and stores the incremented value at its own counter, and stores information indicating that the corresponding connected node is its proximal node in the spanning tree. Accordingly, each node will have only one proximal node in the spanning tree, but can have multiple distal nodes.

While in the READY state 502, the compute node 102 can receive a token indicating, or can otherwise identify, that its proximal node has experienced a failure of some kind. In response, the compute node 102 returns to the IDLE state 501. It will subsequently receive a token indicating that one of its other connected nodes is in the READY state, allowing the compute node 102 to return to the READY state 502 and re-establish its position in the spanning tree relative to its other connected nodes. Thus, the nodes of the fabric 122 can adjust to failures of individual nodes during configuration, improving the robustness of the configuration process.

It will be appreciated that the set 500 represents the different states for only one of the configuration fields for the compute node 102, and that each configuration field can have its own set of corresponding states that differ from the states illustrated at FIG. 5. Further, the compute node 102 can adjust the state of more than one of its configuration fields in each configuration cycle based on the states of the corresponding configuration fields at its connected nodes. For example, in some scenarios the compute node 102 can receive, during the same configuration cycle, a token from one of its connected nodes indicating a change in its interrupt forwarding state and a token from another of its connected nodes indicating a change in its wave message state. Accordingly, during the configuration cycle the compute node 102, in response to the tokens, can update both its interrupt forwarding state and its wave message state and take configuration actions corresponding to the update states for both fields. This allows for configuration of multiple aspects of the compute node 102 during the same configuration cycle, enhancing efficiency of the configuration process.

Figure 6:
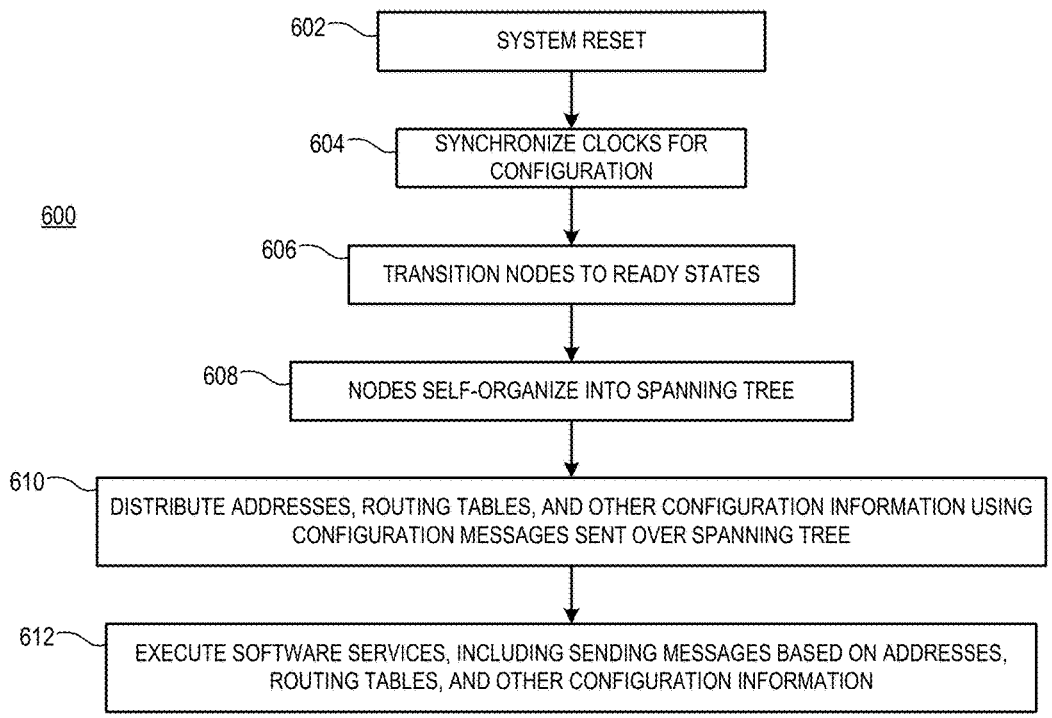
FIG. 6 is a flow diagram of a method of configuring a fabric of a cluster compute server in accordance with some embodiments.

FIG. 6 illustrates a flow diagram of a method 600 of configuring a server in accordance with some embodiments. For purposes of description, the method 600 is described with respect to an example implementation at the fabric 122 described in FIGS. 1-5. At block 602 the server 100 experiences a system reset, such as can occur in response to power being cycled at the server 100, in response to a software reset, activation of a reset switch, and the like. In response to the system reset, each node of the fabric 122 is reset. At block 604 each of the nodes of the fabric 122 synchronizes a local clock, referred to herein as a configuration clock, with the configuration clocks of its connected nodes. Each of the nodes governs its transitions between states of its configuration fields based on its configuration clock. In some embodiments, the configuration clocks of connected nodes are synchronized via an ongoing feedback process within each node. The feedback process is such that the configuration clock of a node is synchronized with its connected nodes within a defined tolerance. The defined tolerance is defined so that the configuration clocks of all the nodes are synchronized within an overall tolerance. The overall tolerance establishes periodic instances wherein every node is expected to have completed any required state transitions. The times defined by these periodic instances are referred to herein as "configuration cycles." In particular, the configuration cycles establish an overall timing structure for state transitions at the nodes of the fabric 122, whereby state transitions at each node are expected to start at or after the beginning of a configuration cycle, and expected to complete at or before the end of the same configuration cycle, even though the configuration clocks of any two given nodes may not be fully synchronized.

At block 606, the nodes of the fabric 122 transition from IDLE states to READY states, in similar fashion to that described above with respect to FIG. 5. In some embodiments, as described further herein, the fabric 122 includes at least one processor, referred to as a management unit (MU) that controls configuration of the fabric 122. The MU is connected to a memory that includes configuration information, such as routing tables, node addresses, and the like, to configure each node of the fabric 122. The MU is connected to one of the compute nodes of the fabric 122. In response to a system reset, the MU executes its own BIOS code to send a command to its connected compute node that transitions the compute node from the IDLE state to the READY state. This causes each functioning node of the fabric 122 to eventually transition to the READY state.

As the nodes transition to READY states, at block 608 they self-organize into a spanning tree as described above with respect to FIG. 5. At block 610, the MU uses messages, such as CHAIN and WAVE messages, to distribute configuration information, to each node. Examples of the configuration information include addresses for each node, routing tables for each node, and the like, to allow each node to communicate with any other node via one or more unicast messages between the nodes. At block 612, the nodes of the fabric 122 execute software services, wherein the execution includes sending messages between the nodes based on the addresses, routing tables, and other configuration information distributed at block 610.

Figure 7:
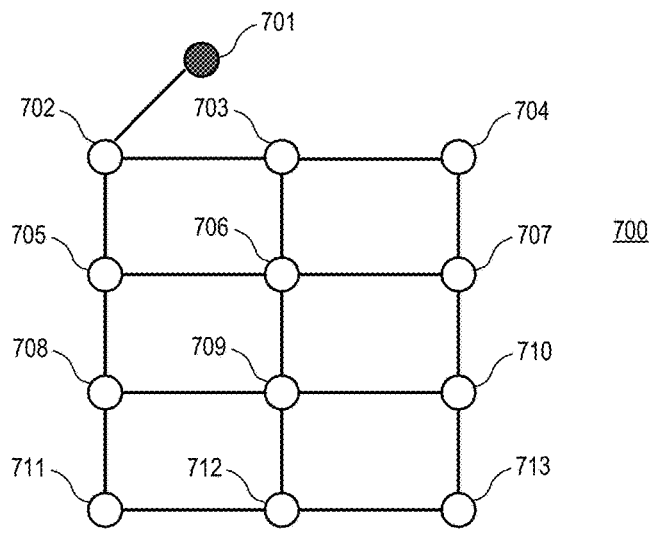
FIG. 7 is a block diagram illustrating an example fabric topology for a cluster compute server including a management unit node in accordance with some embodiments.

FIG. 7 illustrates a fabric 700 including compute nodes 702-713 connected via a fabric interconnect in accordance with some embodiments. The fabric 700 operates in similar fashion to the fabric 122 described above, but is arranged in a two dimensional topology for purposes of description. It will be appreciated that the principles and techniques discussed herein for the fabric 700 also apply to a fabric having a 3D topology (e.g. a 3D torus). In the illustrated example of FIG. 7, the fabric 700 includes a single MU 701 connected to the node 702. The MU 701 controls the configuration of the fabric 700 for execution of software services by initiating transition of the nodes 702-713 to their READY states. Further, once the nodes 702-713 are in their ready states, the MU configures each node by initiating propagation of configuration messages throughout the fabric 700. These techniques can be better understood with reference to the examples of FIGS. 8-10.

Figure 8:
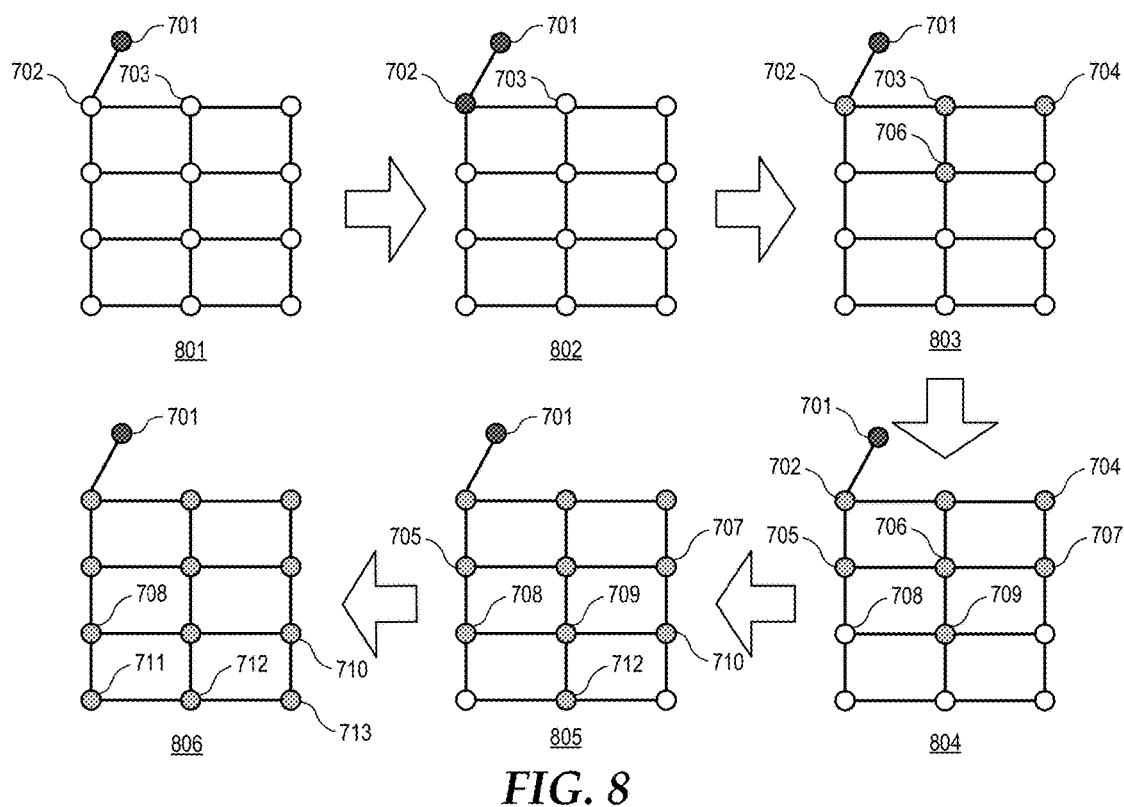
FIG. 8 is a block diagram illustrating state transitions of nodes of FIG. 4 during configuration in accordance with some embodiments.

FIG. 8 illustrates an example sequence wherein the nodes 702-713 transition from IDLE states to READY states in accordance with some embodiments. These transitions cause the nodes 702-713 to self-organize into a spanning tree that governs the propagation of configuration messages through the fabric 700. FIG. 8 illustrates the transitions by depicting a sequence of configuration cycles 801-806. Nodes in the IDLE state are illustrated as circles without cross-hatching, while nodes in the READY state are illustrated as cross-hatched circles.

Prior to configuration cycle 801, the fabric 700 has experienced a system reset, causing initialization of the MU 701 and synchronization of the configuration clocks at the nodes 702-713. At configuration cycle 801, the MU 701 issues a command to the node 702 (e.g. by writing to a designated register of the node 702) to transition its spanning tree state field to the READY state. Accordingly at configuration cycle 802, the node 702 has transitioned its spanning tree state field to the ready state, and therefore issues TOPO tokens to nodes 703, 704, and 706. At configuration cycle 803 nodes 703, 704, and 706 have each transitioned their respective spanning tree state fields from the IDLE state to the READY state, and therefore issue TOPO tokens to their connected nodes (nodes 705, 707, and 609). Accordingly, at configuration cycle 804, nodes 705, 707, and 709 have transitioned from the IDLE state to the READY state, and issue TOPO tokens to their connected nodes (nodes 708, 710, and 712). In response to the TOPO tokens, the nodes 708, 710, and 712 transition their spanning tree state fields to the READY state by configuration cycle 805, and therefore issue TOPO tokens to their connected nodes 711 and 713. In response, the nodes 711 and 713 transition to the READY state at configuration cycle 806. Thus, in the illustrated example of FIG. 8, the nodes 702-713 all transition their spanning tree state fields from IDLE states to READY states based on the MU 401 issuing a command to a single one of the nodes (i.e. node 702). This reduces overhead at the MU 701 relative to a conventional system whereby the MU 701 must individually prepare each node for configuration by sending individual messages to each node via an out-of-band network.

Figure 9:
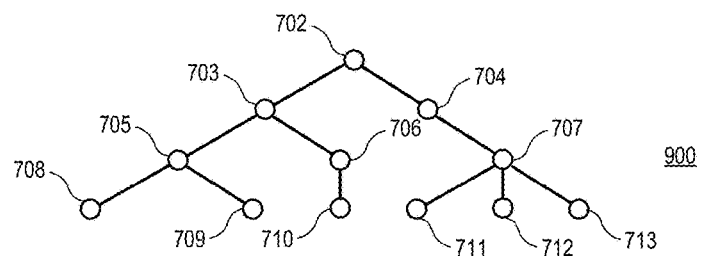
FIG. 9 is a block diagram illustrating an example spanning tree self-organized by nodes of a cluster compute server in accordance with some embodiments.

In similar fashion to that described above with respect to FIG. 5, as the nodes 702-713 transition to the READY state, they self-organize into a spanning tree by identifying their position in the spanning tree relative to one or more of their connected nodes. An example spanning tree 900 is illustrated at FIG. 9. Note that the spanning tree 900 may not represent the spanning tree that is formed by the example sequence of FIG. 8, but instead illustrates a spanning tree for a different fabric topology, in order to show that different ones of the nodes 702-713 can have different numbers of distal nodes in the spanning tree that is formed. Thus, in the illustrated example of spanning tree 900, the node 702 has two distal nodes, nodes 702 and 704, while node 706 has a single distal node 710 and node 707 has three distal nodes 711, 712, and 713. However, each of the nodes 702-713 has only a single corresponding proximal node.

Figure 10:
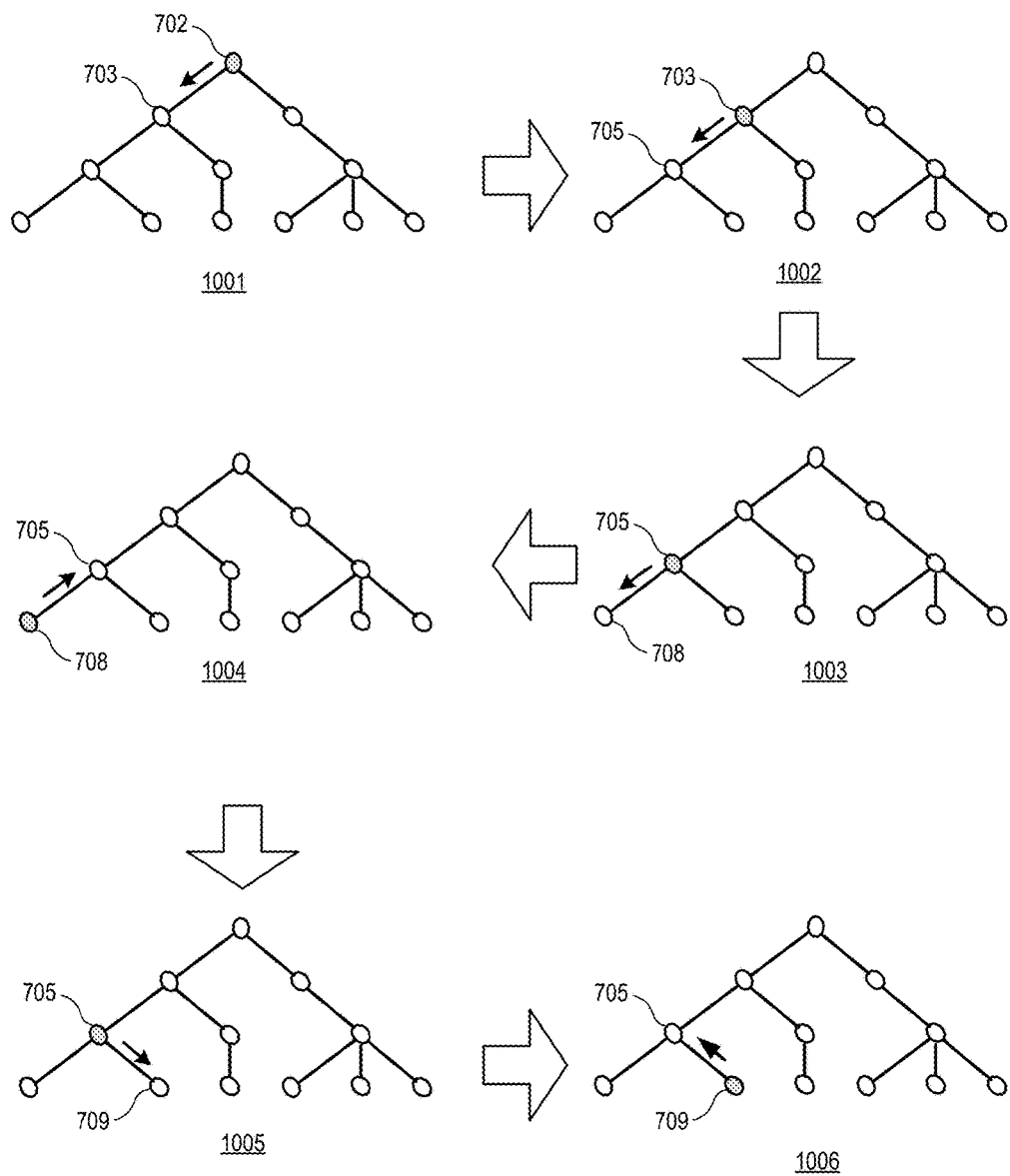
FIG. 10 is a block diagram illustrating an example of communicating a CHAIN-type configuration message over the spanning tree of FIG. 8 in accordance with some embodiments.

Configuration messages can be propagated along the topology of the spanning tree 900 to distribute configuration information from the MU 701 to one or more of the nodes 702-713. In particular, each of the nodes 702-713 manages the states of a configuration field corresponding to the message type in order to manage processing of the different message types. FIG. 10 illustrates an example technique for communicating configuration information using a CHAIN message type. In response to receiving a chain message each of the nodes 702-713 places their CHAIN message state field to a state wherein the node provides the chain message to one of its distal nodes, if any. If a node has more than one distal node in the spanning tree 700, it assigns a fixed number to each of its distal nodes, and transitions its CHAIN message state to a state wherein it sends the CHAIN message to the lowest numbered connected node to which the chain message has not yet been sent. If a node identifies that the message has been sent to all of its distal nodes it transitions its CHAIN message state to a state wherein the node provides the message to its proximal node. The CHAIN message thereby performs a depth traversal of the spanning tree 700, whereby the traversal is concluded with the message being returned the root node 702. From there, the CHAIN message, or a payload thereof, can be provided to the MU 701 for further processing.

FIG. 10 illustrates a set of configuration cycles showing a portion of the propagation of a CHAIN message throughout the fabric in accordance with some embodiments. At configuration cycle 1001 the node 702 receives a chain message from the MU 701. In response it identifies that the message is to be sent to its lowered numbered distal node, identified as node 703, and therefore communicates the message to the output port corresponding to node 703. At configuration cycle 1002, the CHAIN message has been delivered to node 703, and node 703 identifies its connected distal nodes 705 as the lowest numbered distal node that has not yet received the CHAIN message. The node 703 therefore provides the chain message to node 705. At configuration cycle 1003, the node 705 identifies node 708 as its lowest numbered distal node and provides the chain message to node 708. At configuration cycle 1004, the node 708 identifies that it has no distal nodes and therefore communicates the chain message to its proximal node 705. At configuration cycle 1005, the node 705 identifies that its lowest numbered distal node that has not yet received the chain message is node 709. Accordingly, the node 705 provides the chain message to node 709. At configuration cycle 1006 the node 709 determines that it does not have a distal node and therefore provides the chain message to proximal node 705. The node 705 determines that the chain messages been provided to all of its distal nodes and therefore provides a message to its proximal node 703. The chain message continues to traverse the fabric along the according to the topology of the spanning tree 900 until it reaches the root node 702, which can provide the chain message, or payload thereof to the MU 701.

The chain message can be used by the configuration node to send and receive configuration information to one or more of the nodes 702-713. For example, in some embodiments the CHAIN message includes a payload of configuration information, such as address information, routing table information, or other configuration information. The CHAIN message also includes a field that identifies a particular one of the nodes 702-713 as the target of the payload information. In some embodiments, the MU identifies the target of the message by including in the message the relative location of the target node with a tuple (x,y,z,). As each node transfers the CHAIN message to one of its connected nodes, it adjusts the value of the tuple based on the receiving node's relative location to the communicating node. For example, if the receiving node is the "+X" node relative to the communicating node, the communicating node can subtract one to the x-value of the tuple. The tuple will therefore have a value of (0,0,0) when it reaches its destination. As each node receives the chain message, it checks the node identifier of the chain message, and if the tuple value is (0, 0, 0), the node stores the payload at one of its configuration registers, where it can be further processed according to BIOS code executed at the node. In some embodiments, this further processing generates a responsive payload, which the target node can store at the CHAIN message before providing it to the next node in the spanning tree 700. Because of the chain message eventually returns to the root node 702, and from there to the MU 701, the chain message provides a technique both for communicating information from the MU 701 to a target node, and for communicating return information from the target node to the MU 701. Moreover, this communication of configuration information is performed without the MU 701 determining a direct path to the target node, and without any of the nodes 702-713 routing the configuration message along special routing paths defined by the target node's location. This allows the configuration message to be communicated via the same fabric interconnect that is later used, during execution of software services, to communicate messages along defined routing paths between the nodes 702-713.

To illustrate via an example, if the MU 701 wishes to communicate configuration information to node 708, it provides a CHAIN message with the configuration information to node 702 at configuration cycle 1001. By configuration cycle 1004, the CHAIN message has reached the node 708. In response, node 708 identifies that it is the target node for the CHAIN message, and therefore stores the payload information for the chain message at one or more of its configuration registers, generates any responsive information, and stores the responsive information at the payload of the CHAIN message. The node 708 provides the modified chain message to the distal node 705, at configuration cycle 1005. The CHAIN message continues to traverse the spanning tree over subsequent configuration cycles until the CHAIN message has returned to the node 702, which provides the message's payload (including any responsive information from node 708) to the MU 701.

Figure 11:
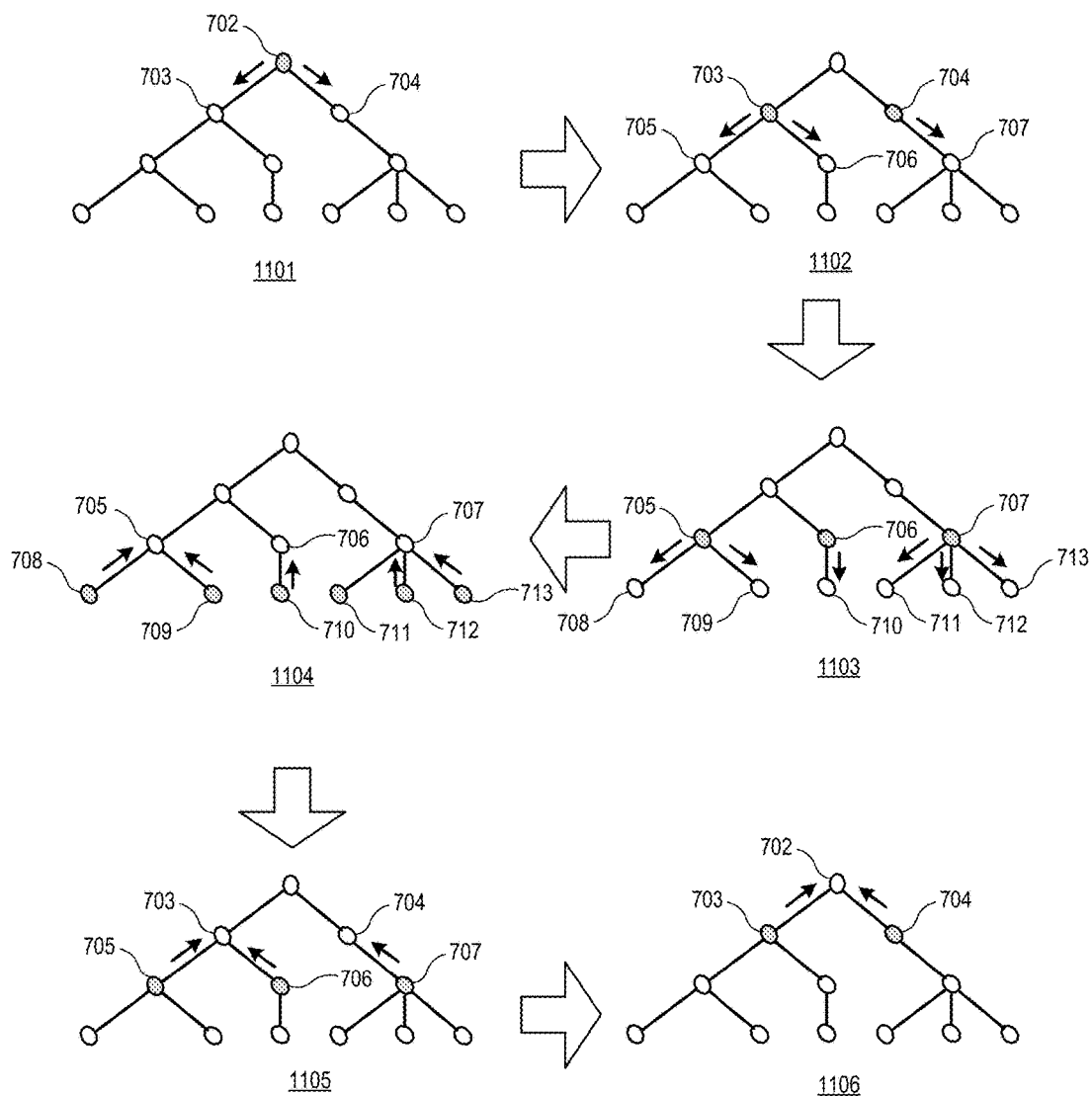
FIG. 11 is a block diagram illustrating an example of communicating a CHAIN-type configuration message over the spanning tree of FIG. 8 in accordance with some embodiments.

FIG. 11 illustrates a sequence of configuration cycles showing how a WAVE message is propagated through the spanning tree 900 in accordance with some embodiments. In response to receiving a WAVE type message, each node places its WAVE message state field into a state wherein the node identifies whether it has previously provided the wave message to its distal nodes, and if not transitions its WAVE state message field wherein the node provides the message to all of its distal nodes. If the message has previously been provided to its distal nodes, the node transitions its WAVE state message field to a state wherein it awaits a response to the WAVE message from all of its distal nodes. Once it has received a response from all of its distal nodes to the WAVE message, the node transitions its WAVE message state field to state wherein the node provides the wave message to its proximal nodes. Thus, in the illustrated example of FIG. 11, at configuration cycle 1101 the node 702 receives a wave message from the MU 701. In response, the node 702 provides the WAVE message to both its distal nodes 703 and 704. At configuration cycle 1102 the nodes 703 and 704 each determine the wave message has not previously been provided to their distal nodes. Accordingly, node 703 provides the WAVE message to its distal node 705 and 706, and node 704 provides the WAVE message to its distal node 707. In similar fashion, at configuration cycle 1103 node 705 provides the WAVE message to its distal nodes 708 and 709, node 706 provides the WAVE message to its distal node 710, and node 707 provides the wave message to its distal nodes 711, 712, and 713.

At configuration cycle 1104, each of the nodes 708-713 identifies that it has no distal nodes in the spanning tree 800. Accordingly each of the nodes 708-713 provides the WAVE message to its corresponding proximal node. For example, node 709 provides the WAVE message to its proximal node 705. At configuration cycles 1105 and 1106 the WAVE message continues to progress distally along the spanning tree 900, until it has returned to the MU 701 at configuration cycle 1106.

Figure 12:
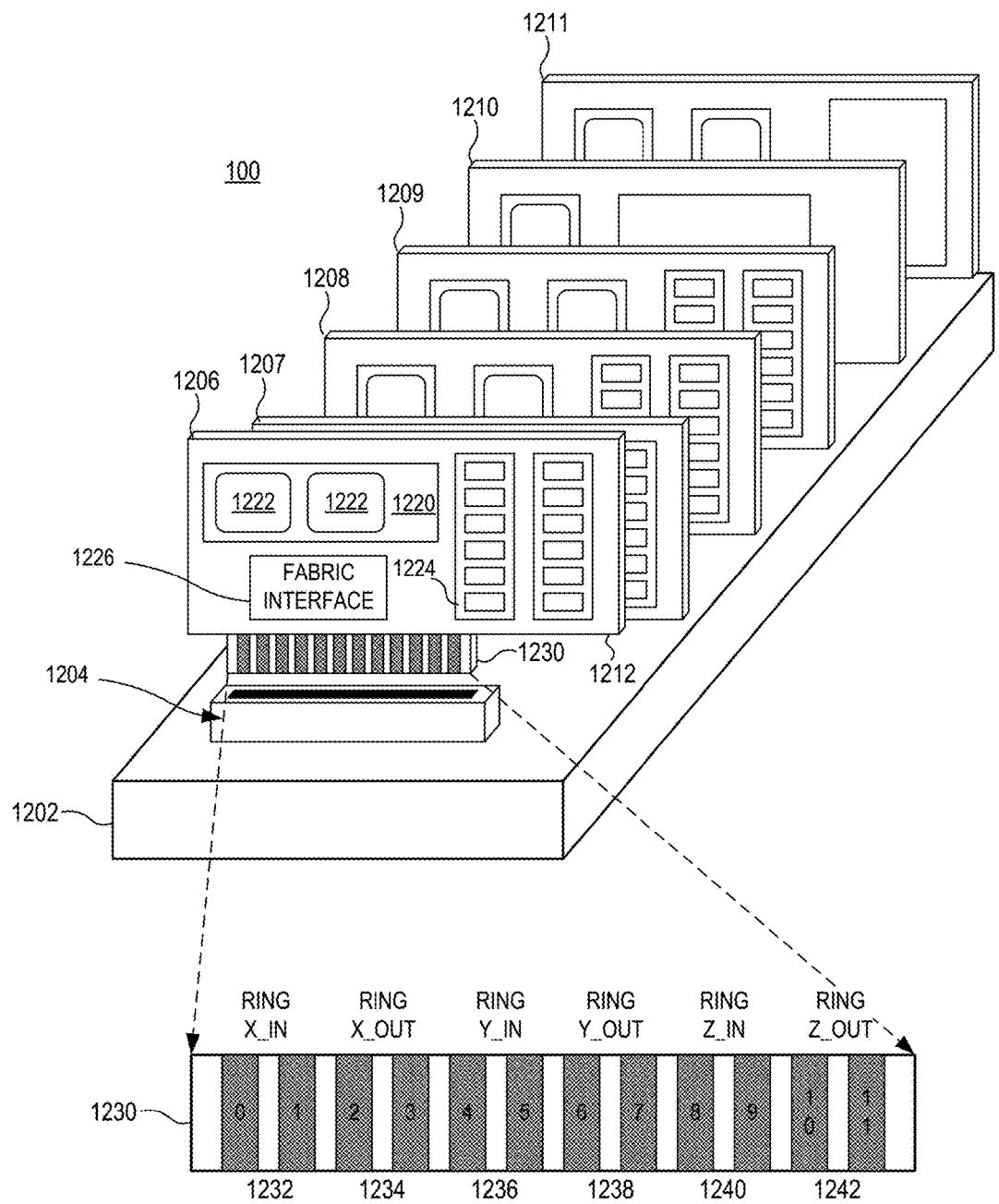
FIG. 12 is a block diagram illustrating an example physical arrangement of nodes of a cluster compute server in accordance with some embodiments.

FIG. 12 illustrates an example physical arrangement of nodes of the server 100 in accordance with some embodiments. In the illustrated example, the fabric interconnect 112 (FIG. 1) includes one or more interconnects 1202 having one or more rows or other aggregations of plug-in sockets 1204. The interconnect 1202 can include a fixed or flexible interconnect, such as a backplane, a printed wiring board, a motherboard, cabling or other flexible wiring, or a combination thereof. Moreover, the interconnect 1202 can implement electrical signaling, photonic signaling, or a combination thereof. Each plug-in socket 1204 comprises a card-edge socket that operates to connect one or more FRUs, such as FRUs 1206-1211, with the interconnect 1202. Each FRU represents a corresponding node of the server 100. For example, FRUs 1206-1209 may comprise compute nodes, FRU 1210 may comprise a network node, and FRU 1211 can comprise a storage node. One or more of the FRUs 1206-1211 may also include a corresponding management unit.

Each FRU includes components disposed on a PCB, whereby the components are interconnected via metal layers of the PCB and provide the functionality of the node represented by the FRU. For example, the FRU 1206, being a compute node in this example, includes a PCB 1212 implementing a processor 1220 comprising one or more processor cores 1222, one or more memory modules 1224, such as DRAM dual inline memory modules (DIMMs), and a fabric interface device 1226. Each FRU further includes a socket interface 1240 that operates to connect the FRU to the interconnect 1202 via the plug-in socket 1204.

The interconnect 1202 provides data communication paths between the plug-in sockets 1204, such that the interconnect 1202 operates to connect FRUs into rings and to connect the rings into a 2D- or 3D-torus network topology, such as the torus network 300 of FIG. 3. The FRUs take advantage of these data communication paths through their corresponding fabric interfaces, such as the fabric interface device 1226 of the FRU 1206. The socket interface 1230 provides electrical contacts (e.g., card edge pins) that electrically connect to corresponding electrical contacts of plug-in socket 1204 to act as port interfaces for an X-dimension ring (e.g., ring-X_IN port 1232 for pins 0 and 1 and ring-X_OUT port 1234 for pins 2 and 3), for a Y-dimension ring (e.g., ring-Y_IN port 1236 for pins 4 and 5 and ring-Y_OUT port 1238 for pins 6 and 7), and for an Z-dimension ring (e.g., ring-Z_IN port 1240 for pins 8 and 9 and ring-Z_OUT port 1242 for pins 10 and 11). In the illustrated example, each port is a differential transmitter comprising either an input port or an output port of, for example, a PCIE lane. A skilled artisan will understand that a port can include additional TX/RX signal pins to accommodate additional lanes or additional ports.

Figure 13:
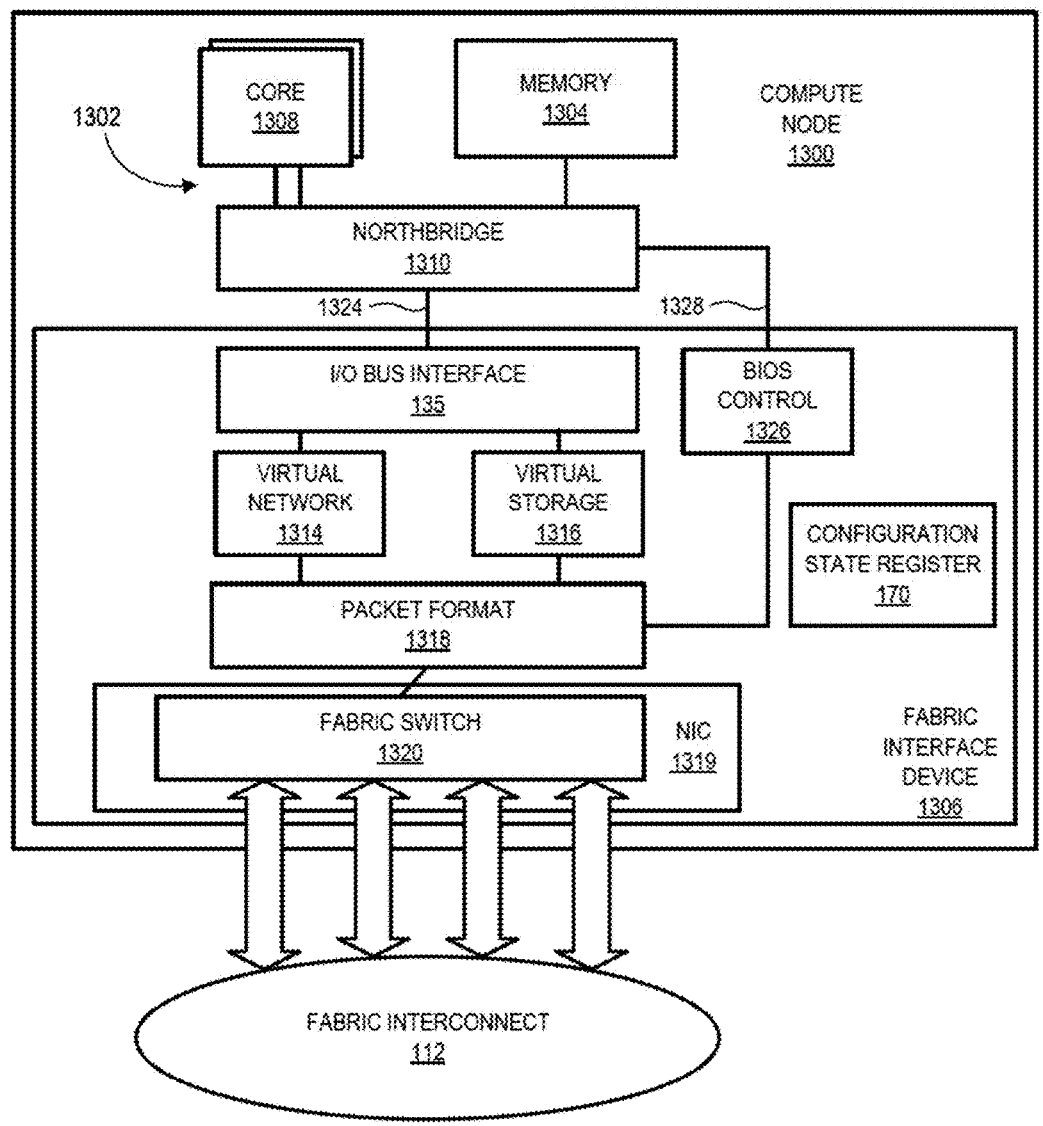
FIG. 13 is a block diagram illustrating an example implementation of a compute node of a cluster compute server in accordance with some embodiments.

FIG. 13 illustrates a compute node 1300 implemented in the server 100 of FIG. 1 in accordance with some embodiments. The compute node 1300 corresponds to, for example, one of the compute nodes 101-106 of FIG. 1. In the depicted example, the compute node 1300 includes a processor 1302, system memory 1304, and a fabric interface device 1306 (representing the processor 1320, the one or more memory modules 1224, and the fabric interface device 1226, respectively, of FIG. 12). The processor 1302 includes one or more processor cores 1308 and a northbridge 1210. The one or more processor cores 1308 can include any of a variety of types of processor cores, or combination thereof, such as a central processing unit (CPU) core, a graphics processing unit (GPU) core, a digital signal processing unit (DSP) core, and the like, and may implement any of a variety of instruction set architectures, such as an x86 instruction set architecture or an Advanced RISC Machine (ARM) architecture. The system memory 1204 can include one or more memory modules, such as DRAM modules, SRAM modules, flash memory, or a combination thereof. The northbridge 1310 interconnects the one or more cores 1308, the system memory 1304, and the fabric interface device 1306. The fabric interface device 1306, in some embodiments, is implemented in an integrated circuit device, such as an application-specific integrated circuit (ASIC), a field-programmable gate array (FPGA), mask-programmable gate arrays, programmable logic, and the like.

In a conventional computing system, the northbridge 1310 would be connected to a southbridge, which would then operate as the interface between the northbridge 1310 (and thus the processor cores 1308) and one or local more I/O controllers that manage local peripheral resources. However, as noted above, in some embodiments the compute node 1300 does not maintain local peripheral resources or their I/O controllers, and instead uses shared remote peripheral resources at other nodes in the server 100. To render this arrangement transparent to software executing at the processor 1302, the fabric interface device 1306 virtualizes the remote peripheral resources allocated to the compute node such that the hardware of the fabric interface device 1306 emulates a southbridge and thus appears to the northbridge 1310 as a local southbridge connected to local peripheral resources.

To this end, the fabric interface device 1306 includes an I/O bus interface 1312, a virtual network controller 1314, a virtual storage controller 1316, a packet formatter 1318, and a NIC 1319 comprising a fabric switch 1320. The I/O bus interface 1312 connects to the northbridge 1310 via a local I/O bus 1324 and acts as a virtual endpoint for each local processor core 1208 by intercepting requests addressed to virtualized peripheral resources that appear to be on the local I/O bus 1324 and responding to the requests in the same manner as a local peripheral resource, although with a potentially longer delay due to the remote location of the peripheral resource being virtually represented by the I/O bus interface 1312.

While the I/O bus interface 1312 provides the physical interface to the northbridge 1310, the higher-level responses are generated by the virtual network controller 1314 and by the virtual storage controller 1316. Requests sent over I/O bus 1324 for a network peripheral connected to an external network, such as an Ethernet NIC connected to the data center network 114 (FIG. 1), are routed by the I/O bus interface 1312 to the virtual network controller 1314, while storage requests are routed by the I/O bus interface 1312 to the virtual storage controller 1316. The virtual network controller 1314 provides processing of incoming and outgoing requests based on, for example, an Ethernet protocol. The virtual storage controller provides processing of incoming and outgoing requests based on, for example, a serial ATA (SATA) protocol, a serial attached SCSI (SAS) protocol, a Universal Serial Bus (USB) protocol, and the like.

After configuration of each of the compute nodes as described above with respect to FIGS. 1-11, the compute node 1300 executes software services that generate requests. After being processed by either the virtual network controller 1314 or the virtual storage controller 1316, requests are forwarded to the packet formatter 1318, which encapsulates the request into one or more packets. The packet formatter 1318 then determines the fabric address or other location identifier of the I/O node managing the physical peripheral resource intended for the request. The packet formatter 1318 adds the identified fabric address (referred to herein as the "fabric ID") to the headers of the one or more packets in which the request is encapsulated and provides the packets to the fabric switch 1320 of the NIC 1319 for transmission.

As illustrated, the fabric switch 1320 implements a plurality of ports, each port interfacing with a different link of the fabric interconnect 112. To illustrate using the 3×3 torus network 200 of FIG. 2, assume the compute node 1300 represents the node at (1,1,1). In this example, the fabric switch 1320 would have at least seven ports to couple it to seven bi-directional links: an internal link to the packet formatter 1318; an external link to the node at (0,1,1); an external link to the node at (1,0,1), an external link to the node at (1,1,0), an external link to the node at (1,2,1), an external link to the node at (2,1,1), and an external link to the node at (1,1,2). After configuration of the compute node 1200, control of the switching of data among the ports of the fabric switch 1320 is determined based on integrated deterministic switching logic, which specifies the egress port based on the destination address (that is, destination fabric ID) indicated by the packet and based on the deterministic routing implemented in the server 100. The destination fabric ID of each compute node can be distributed to the respective nodes during configuration. For example, an MU can distribute to each compute node its destination fabric ID via a series of CHAIN messages as described above.

After configuration by the MU, and during normal execution of software services, the compute node 1300 handles received packets as follows. For packets received from another other node, wherein the packet's destination is the compute node 1300, the fabric switch 1320 routes the incoming packet to the port connected to the packet formatter 1318 based on the deterministic routing logic. The packet formatter 1318 then de-encapsulates the response/request from the packet and provides it to either the virtual network controller 1314 or the virtual storage controller 1316 based on a type-identifier included in the request. The controller receiving the request then processes the response/request and controls the I/O bus interface 1312 to signal the request to the northbridge 1310, whereupon the response/request is processed as though it were a response or request from a local peripheral resource.

For a transitory unicast packet for which the compute node 1300 is an intermediate node in the routing path for the packet, the fabric switch 1320 determines the destination address (e.g., the tuple (x,y,z)) from the header of the transitory packet, and provides the packet to a corresponding output port identified by the deterministic routing logic. In some embodiments, the fabric switch 1320 determines the destination address using a locally stored routing table. During configuration, the MU can distribute routing tables to each compute node using CHAIN messages or WAVE messages, as described above.

As noted above, a portion of the BIOS to configure the compute node 1300 likewise can be a virtualized peripheral resource. In such instances, the fabric interface device 1306 can include a BIOS controller 1326 connected to the northbridge 1310 either through the local I/O bus 1224 or via a separate low pin count (LPC) bus 1328. As with storage and network resources, the BIOS controller 1326 can emulate a local BIOS by responding to BIOS requests from the northbridge 1310 by forwarding the BIOS requests via the packet formatter 1318 and the fabric switch 1320 to a I/O node managing a remote BIOS, and then providing the BIOS data supplied in turn to the northbridge 1310.

In the illustrate example of FIG. 13, the fabric interface device 1306 includes the configuration state register 170. During configuration of the server 100, the fabric interface device 1306 updates the fields of the configuration state register 170 in response to updates of corresponding fields of the configuration state registers at the nodes connected to the compute node 1300, as described above with respect to FIGS. 1-12. Based on the state of each of the fields at the configuration register 170, the fabric interface device identifies the position of the compute node 1300 in a spanning tree relative to its connected nodes, receives, processes, and communicated configuration messages, and performs other configuration operations.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions described above. In some embodiments, the apparatus and techniques described above are implemented in a system comprising one or more integrated circuit (IC) devices (also referred to as integrated circuit packages or microchips), such as certain components of the server 100 (e.g., the fabric interface device or the compute node) described above with reference to FIGS. 1-13. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 14:
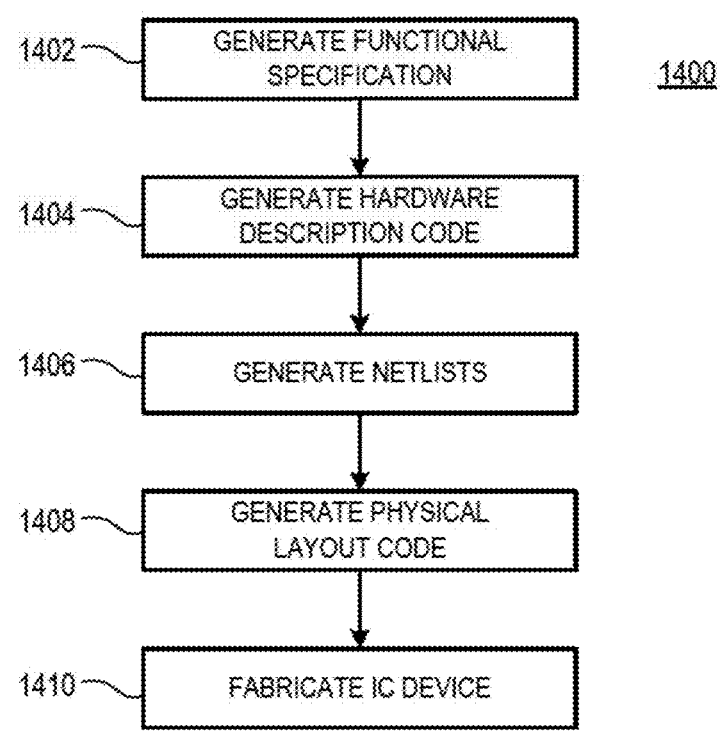
FIG. 14 is a flow diagram illustrating a method for designing and fabricating an integrated circuit (IC) device in accordance with some embodiments.

FIG. 14 is a flow diagram illustrating an example method 1400 for the design and fabrication of an IC device implementing one or more aspects. As noted above, the code generated for each of the following processes is stored or otherwise embodied in computer readable storage media for access and use by the corresponding design tool or fabrication tool.

At block 1402 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 1404, the functional specification is used to generate hardware description code representative of the hardware of the IC device. In at some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 1406 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 1408, one or more EDA tools use the netlists produced at block 1406 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 1410, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A server system, comprising:
   a fabric interconnect to route messages during execution of software services;
   a plurality of compute nodes coupled to the fabric interconnect to execute software services for the server system, each of the plurality of compute nodes configured as a cell in a cellular automaton, and wherein a state of at least one state field for each of the plurality of compute nodes is set based on received configuration information representative of state changes in a configuration register of a connected node in the plurality of compute nodes, using the fabric interconnect.

2. The server system of claim 1, wherein each of the plurality of compute nodes is to:
   effect transitions in a set of state fields among predefined sets of states in response to transitions in states of corresponding state fields at connected compute nodes;
   receive routing information based on the transitions of the set of state fields; and
   route received messages to others of the plurality of compute nodes via the fabric interconnect based on the routing information.

3. The server system of claim 2, wherein each of the plurality of compute nodes is to:
   identify its location relative to one or more of its connected compute nodes in a spanning tree based on the transitions in the set of state fields.

4. The server system of claim 3, wherein each of the plurality of compute nodes
   communicates, via the fabric interconnect, routing information to a connected compute node based on the spanning tree, the communication based on the transitions in the set of state fields.

5. The server system of claim 3, wherein at least one of the plurality of compute nodes
   in response to receiving a message of a first type,
      communicates the message of the first type to a selected first one of a plurality of distal nodes in the spanning tree relative to the at least one compute node's position in the spanning tree based on the transitions in the set of state fields.

6. The server system of claim 5, wherein the at least one of the plurality of compute nodes,
   in response to subsequently receiving the message of the first type from the selected first one of the plurality of distal nodes:
      communicates the message of the first type to a selected second one of the plurality of distal nodes based on the transitions in the sets of state fields.

7. The server system of claim 6, wherein the at least one of the plurality of compute nodes,
   in response to subsequently receiving the message of the first type from the selected second one of the plurality of distal nodes:
      communicate the message of the first type to a proximal node of the at least one compute node in the spanning tree based on the transitions in the sets of state fields.

8. The server system of claim 5, wherein the at least one of the plurality of compute nodes,
   in response to identifying that a payload of the message of the first type is targeted to the at least one of the plurality of compute nodes, stores the payload of the message at a configuration register of the at least one of the plurality of compute nodes based on the transitions in the sets of state fields.

9. The server system of claim 5, wherein the at least one of the plurality of compute nodes,
   in response to receiving a message of a second type,
      concurrently communicates the routing information to each of the plurality of distal nodes in the spanning tree relative to the at least one compute node's position in the spanning tree based on the transitions in the sets of state fields.

10. The server system of claim 2, wherein the routing information is node address information that identifies a location of one of the plurality of compute nodes in the fabric interconnect.

11. The server system of claim 1, wherein a first compute node of the plurality of compute nodes identifies a configuration of a second compute node to which it is not connected based on transitions in states of the first compute node's connected compute nodes.

12. A server system, comprising:
a fabric interconnect to route messages;
a plurality of field replaceable units (FRUs) comprising a plurality of compute nodes coupled to the fabric interconnect to execute services for the server system, each of the compute nodes to:
effect transitions in a set of state fields among predefined sets of states in response to transitions in states of corresponding state fields at connected compute nodes;
receive routing information based on the transition of the set of state fields; and
route received messages to others of the plurality of compute nodes via the fabric interconnect based on the routing information.

13. The server system of claim 12, wherein each of the compute nodes is to:
identify its location relative to one or more of its connected compute nodes in a spanning tree based on the transitions in the sets of state fields.

14. The server system of claim 13, wherein each of the compute nodes is to:
communicate, via the fabric interconnect, the routing information to a second connected compute node based on the spanning tree based on the transitions in the sets of state fields.

15. The server system of claim 13, wherein at least one of the compute nodes,
in response to receiving a message of a first type,
communicates the message of the first type to a selected first one of a plurality of distal nodes in the spanning tree relative to the at least one of the compute node's position in the spanning tree based on the transitions in the sets of state fields.

16. The server system of claim 15, wherein the at least one of the compute nodes,
in response to receiving a message of a second type,
concurrently communicate the routing information to each of the plurality of distal nodes in the spanning tree relative to the at least one of the compute node's position in the spanning tree based on the transitions in the sets of state fields.

17. The server system of claim 16, wherein the at least one of the compute nodes,
in response to identifying that a payload of the message of the first type is targeted to the at least one of the compute nodes, stores the payload of the message at a configuration register of the at least one the compute nodes based on the transitions in the sets of state fields.

18. A method, comprising:
in response to a system reset at a server comprising a plurality of compute nodes coupled to a fabric interconnect to route messages:
at a first compute node of the plurality of compute nodes, effecting transitions in a set of state fields among predefined sets of states in response to transitions in states of corresponding state fields at connected compute nodes;
receiving routing information based on the transitions of the set of state fields; and
routing received messages to others of the plurality of compute nodes via the fabric interconnect based on the routing information.

19. The method of claim 18, further comprising:
identifying, at the first compute node, the first compute node's location relative to one or more of its connected compute nodes in a spanning tree based on the transitions of the set of state fields.

20. The method of claim 19, further comprising:
communicating, via the fabric interconnect, routing information from the first compute node to a connected compute node based on the spanning tree, the communication based on the transitions in the set of state fields.

* * * * *